Jan. 11, 1966   H. M. VALENTINE   3,228,731
VARIABLE PRESSURE RATIO VALVE
Filed April 23, 1962   3 Sheets-Sheet 3

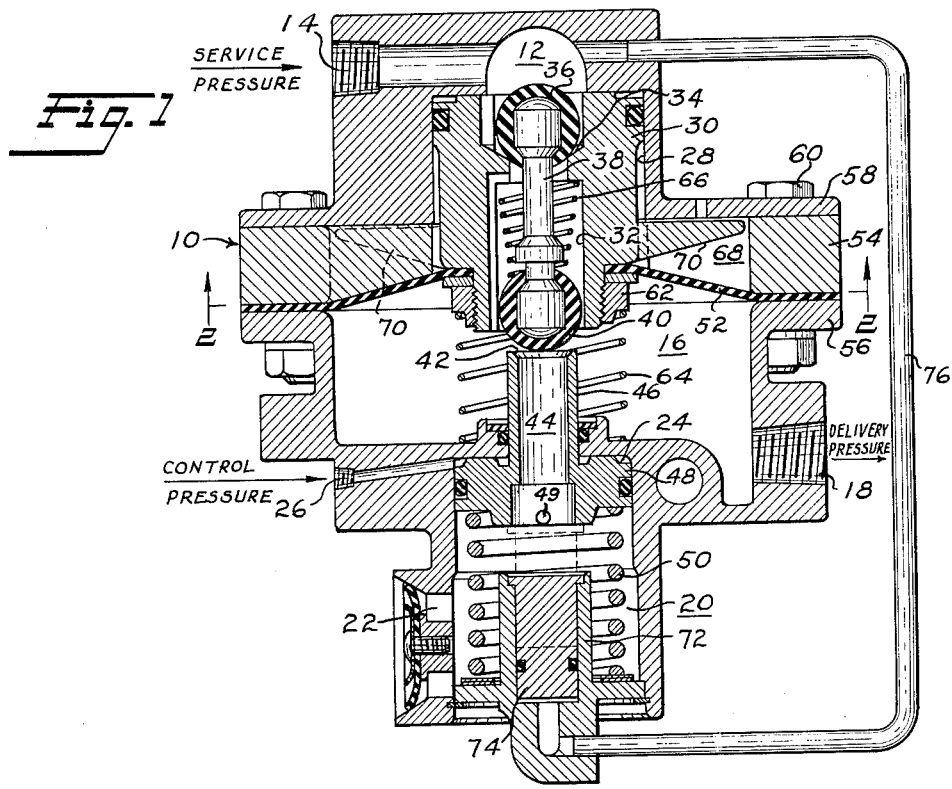
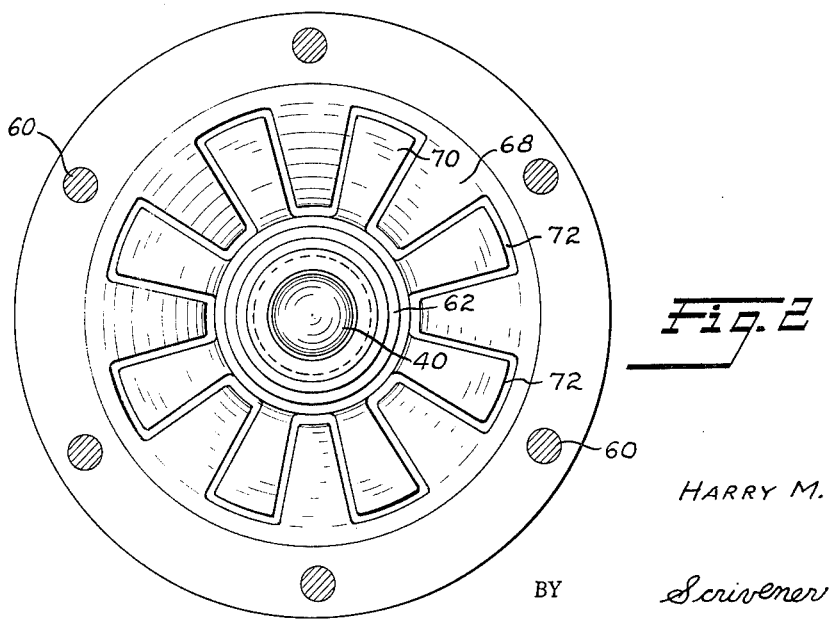

INVENTOR
HARRY M. VALENTINE
BY Scrivener & Parker
ATTORNEY

United States Patent Office 3,228,731
Patented Jan. 11, 1966

3,228,731
VARIABLE PRESSURE RATIO VALVE
Harry M. Valentine, Elyria, Ohio, assignor to Bendix-Westinghouse Automotive Air Brake Company, Elyria, Ohio, a corporation of Delaware
Filed Apr. 23, 1962, Ser. No. 189,634
1 Claim. (Cl. 303—60)

This invention relates to valves and more particularly to an infinitely variable pressure ratio valve.

In my prior application, Serial No. 78,933, filed on December 28, 1960, now Patent No. 3,125,379, dated Mar. 17, 1964 there is disclosed an infinitely variable pressure ratio valve which, like the present valve, is especially suited for use in fluid pressure brake systems and when so used it serves to deliver to the brake chambers a pressure which is proportionately less than the pressure from the manually operated brake valve depending upon the load on the vehicle. The valve of the application performs its function with complete satisfaction by the use of two diaphragms and means for proportionately varying the effective areas of both diaphragms simultaneously. It is an object of the present invention to provide an improved infinitely variable pressure ratio valve which produces the same results as the valve of the application but utilizes only a single diaphragm.

Another object of the invention is to provide a valve for accomplishing the foregoing but which instead of utilizing a variable effective area which is subjected to brake valve pressure, employs a pressure responsive member having a constant effective area exposed to the latter, with the variable effective area being supplied by a diaphragm which is exposed solely to the pressure delivered to the brake chambers.

Still another object of the invention is to provide a valve of the foregoing nature which for any given load on the vehicle delivers braking pressure to the brake chambers which is proportional to the pressure supplied from the brake valve over the entire range of movement of the brake valve from its fully closed to its fully opened position, such that the ratio of delivered to supplied brake pressure is equal to one (1) for a fully loaded vehicle and is something less than one (1) for the empty vehicle depending on the empty-to-loaded weight ratio of the vehicle, or more particularly the axle to which the valve is pneumatically connected.

Still another object of the invention is to provide an infinitely variable proportioning brake valve wherein the ratio between brake valve and brake chamber pressures may desirably be determined by the positioning of a pressure-responsive member which is movable by control pressure inversely proportional to vehicle load.

Still another object of the invention is to provide fluid pressure control means of the foregoing nature which upon failure of the control pressure is automatically moved to a non-controlling position so that pressure delivered to the brake chambers will be equal to that supplied from the brake valve.

Still another object of the invention is to provide a proportioning valve wherein the ratio between the inlet and delivery pressures is determined by a single, variable area diaphragm whose effective area is determined by the positioning of a movable exhaust valve seat, means being provided for moving said seat to a predetermined position depending upon a variable outside condition such as, for example, the weight of a load on a vehicle.

Other objects and their attendant advantages will become apparent as the following detailed description is read in conjunction with the accompanying drawings wherein:

FIG. 1 is a vertical cross-sectional view of the valve of the present invention;

FIG. 2 is a horizontal cross-sectional view taken substantially on the line 2—2 of FIG. 1;

Figure 3:
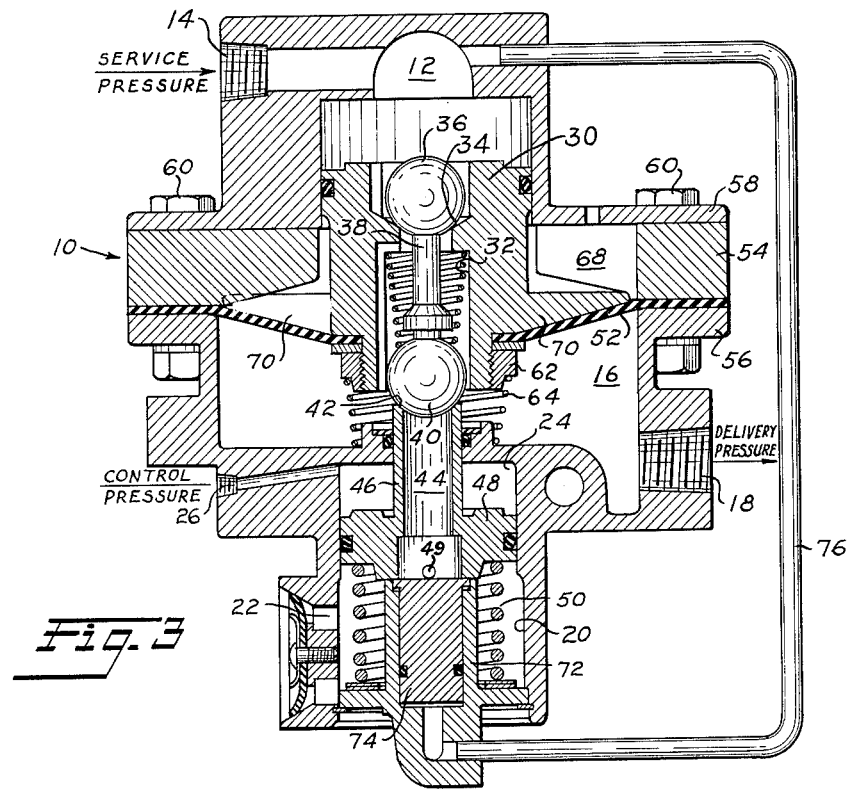
FIG. 3 is a vertical cross-sectional view similar to FIG. 1 showing the valve of the invention in its position for delivering minimum proportional pressures as when a vehicle is lightly loaded; and, FIG. 4 is a broken cross-sectional view showing the position of certain of the valve parts during brake application when the vericle is partly loaded.

Referring now to the drawings, the valve of the invention comprises a casing 10 whose interior is divided into an inlet chamber 12 connected by way of port 14 to a conventional brake valve (not shown), a delivery chamber 16 connected by way of port 18 either with conventional brake chambers (not shown) or with a relay valve, an exhaust chamber 20 connected by way of an exhaust port 22 with atmosphere, and a control chamber 24 connected with a source of control pressure (not shown) by way of a port 26.

Interconnecting the inlet and delivery chambers 12, 16 is an elongated cylindrical passage 28 which slideably receives a piston member 30 whose upper surface is exposed at all times to the pressure in the inlet chamber. Extending axially through the piston member 30 is a passage 32 which has adjacent to its upper end a valve seat 34 adapted to be sealingly engaged by a valve member 36 which is integrally connected to a second valve member 40 adapted to engage an exhaust valve seat 42 at the upper end of a passage 44 in a hollow plunger 46, which in the position of the parts as shown in FIG. 1 serves to connect the delivery chamber 16 and hence the brake chambers with atmosphere by way of aforementioned exhaust chamber 20 and port 22. Integrally connected to the lower end of the plunger 46 is a piston member 48 which is slideably received in the exhaust chamber 20 and is urged by a graduating spring 50 to the upper position shown in FIG. 1. The upper side of the piston 48 is exposed at all times to the pressure in the control chamber 24, which is derived through port 26 from the control pressure source, the latter being inversely proportional to the load on the vehicle for reasons that will become apparent hereinafter. One or more openings 49 are provided in the lower portion of piston 48 in order to assure communication at all times between the passage 44 and the exhaust chamber 20.

The upper wall of the delivery chamber 16 comprises a flexible diaphragm 52 whose outer peripheral edge is clamped between the lower surface of an annular member 54 and the upper surface of a lower casing member 56, which, with an upper casing member 58 and bolts 60, serve to complete the casing structure. The center of the diaphragm 52 is suitably apertured and clamped by means of a lock nut 62 to the lower end of the piston 30, and the entire assembly is urged to the upper position of FIG. 1 by means of a relatively light spring 64, a second spring 66, normally urging the inlet valve 36 into its seated position shown.

Integral with the annular member 54 are a plurality of fingers 68 which extend radially inwardly as shown in FIG. 2, and integral with the piston 30 immediately above the diaphragm 52 are a plurality of fingers 70 which extend radially outwardly into the spaces 72 between adjacent fingers 68. The lower surfaces of the fingers 68 slope inwardly and upwardly while the lower surfaces of the fingers 70 slope upwardly and outwardly.

With this arrangement, it will be apparent that when the piston member 30 is in its fully raised position, the upper surface of the diaphragm 52 is engaged almost entirely by the lower surfaces of the fixed fingers 68 while the lower surfaces of the movable fingers 70 are entirely clear of the diaphragm. However, when the piston 30 is moved downwardly in response to fluid pressure admitted to the inlet cavity 12 the movable fingers 70 progressively engage the diaphragm 52 while simultaneously disengaging it from the fixed fingers 68, thereby progressively increasing the effective area of the diaphragm exposed to whatever pressure may exist in the delivery cavity 16.

No pressure is admitted to the cavity 16 until such time as the inlet valve 36 is raised from its seat and this takes place only after the exhaust valve 40 has engaged the movable exhaust valve seat 42 at the upper end of the plunger 46. As has been previously mentioned, the position of the exhaust valve seat is determined by control pressure in chamber 24 which is inversely proportional to the load on the vehicle. Thus with the vehicle fully loaded, there would be substantially no pressure in the chamber 24 and the exhaust valve seat 42 would be in the fully raised position of FIG. 1. On the other hand, where the vehicle is lightly loaded maximum control pressure would be delivered to chamber 24 so that the piston 48 and hence the valve seat 42 would be in the fully retracted position of FIG. 3 where it will be noted the lower surface of the piston 48 engages the upper surface of a hollow cylindrical boss 72 which serves as a limit stop for the control piston. Slideably received within the boss 72 is a pressure-responsive piston member 74 whose lower surface is exposed to inlet pressure derived from the inlet chamber 12 by way of a conduit 76. The cross-sectional area of the piston 74 exposed to inlet pressure is the same as the cross-sectional area defined by the inlet valve seat 34 so that when inlet pressure is received on the lower surface of the piston member 74 it is extended as indicated by the dotted line in FIG. 1 into abutment with the lower surface of the control piston 48 to cancel or balance out inlet chamber pressure acting downwardly on the valve which pressure in the absence of balancing might move the valve seat 42 downwardly to a position not related to vehicle load thereby causing an incorrect delivery of braking pressure.

Control pressure inversely proportional to vehicle load may be derived in a variety of ways, one means being described in the aforementioned application Serial No. 78,933 to which reference is made for a description of a system which may be effectively employed. The desirability of providing control pressure which is inversely rather than directly proportional to load is that in the event of total loss of control pressure the piston 48 is automatically moved to the vehicle loaded position of FIG. 1 thus permitting normal brake actuation exactly as if the valve of the invention were not in the braking system. It will be apparent that control pressure directly proportional to load may be utilized if the fail-safe feature afforded by the inverse pressure is not considered necessary or desirable. Under these circumstances it will be apparent to those skilled in the art that the graduating spring would act downwardly on the piston 48 and the control and exhaust ports would be merely reversed.

It is, of course, entirely within the purview of the invention that the exhaust port be positioned by means other than pressure as, for example, by manually adjustable means or by a system of linkages responsive to the relative movement between the sprung and unsprung portions of the vehicle.

Figure 5:
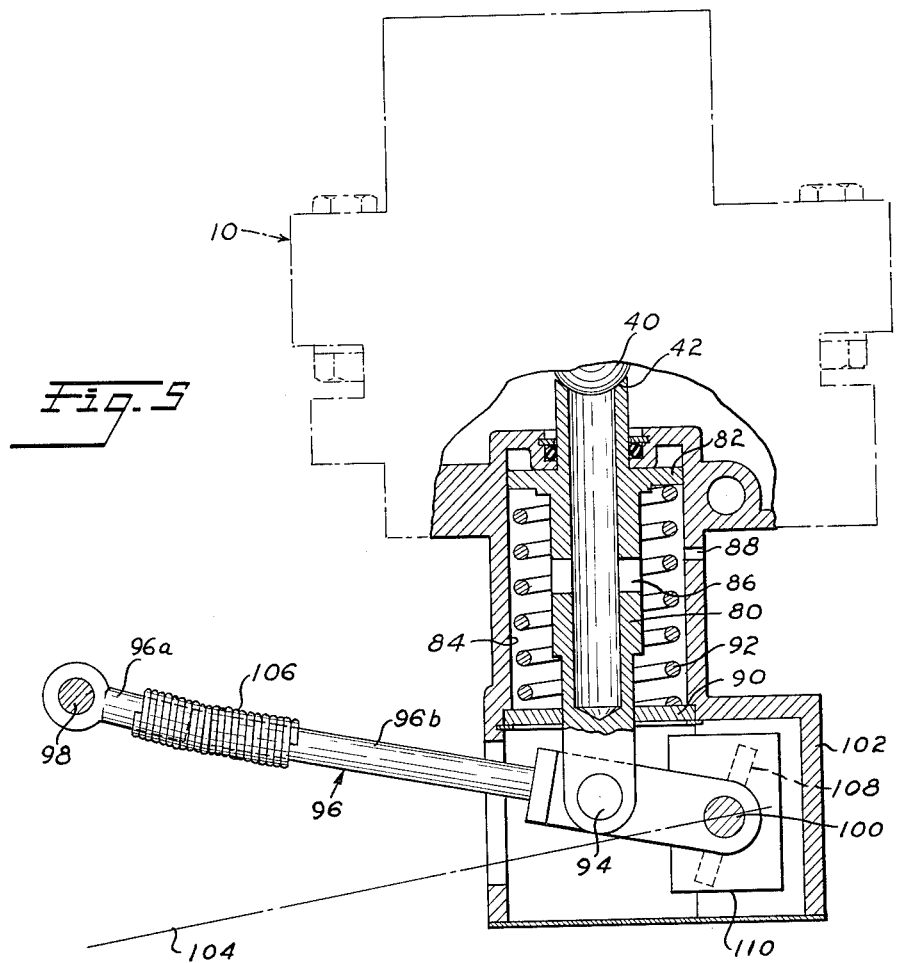
FIG. 5 is a broken cross-sectional view showing a second embodiment of the present invention.

A system of the latter type is illustrated in FIG. 5 where it will be noted that in lieu of a pressure responsive member for controlling the position of the valve seat 42, a plunger 80 is provided which has an integral flange 82 slideably received within a cylindrical bore 84. The interior of the plunger 80 is hollow and is connected to the bore 84 by way of a port 86 and the bore 84, in turn, is connected to atmosphere by way of port 88. The lower end of the bore is closed by a washer-like closure member 90 and interposed between the upper surface of the member 90 and the lower surface of the flange 82 is a spring 92 which normally urges the plunger and hence the valve seat 42 to the upper or vehicle-loaded position of the drawing.

The closure member 90 has a central opening through which there extends the lower end of the plunger which is pivotally connected by means of a pin 94 to a lever 96 whose opposite ends are pivotally connected by pins 98, 100 to respective sprung and unsprung parts of the vehicle. The pivoted end 98 is directly connected to the vehicle axle (not shown) and the end 100 may be pivotally supported between suitable bearings in a lower housing member 102 integral with the valve casing which in turn may be bolted or otherwise attached to a convenient part of the vehicle body.

It will be apparent that with the above described arrangement that as the vehicle load is increased so that the body of the vehicle descends with respect to the vehicle axle, the lever 96 will be rotated in a clock-wise direction in FIG. 5 so as to move the plunger 82 and hence the valve seat 42 towards its upper, vehicle-loaded position. On the other hand, as the load is removed from the vehicle, the springs will cause the vehicle body to move upwardly with respect to the axle thus causing the lever 96 to move in a counter clock-wise direction to lower the valve seat and when the vehicle is completely unloaded the lever 96 may take the position indicated by the line 104 so that the seat is in a position of maximum depression to provide a maximum differential between service and delivery pressures as previously described in connection with the embodiment of FIG. 1.

In order to prevent vehicle bouncing, during over-the-road operation, from causing the valve seat to move between widely varying positions not related to actual vehicle load, damping means may be provided. The damping means illustrated in FIG. 5 is afforded by constructing the lever 96 of two parts 96a and 96b interconnected by a relatively stiff spring 106 which serves to provide a yield point along the length of the lever so that the part 96a which is pivoted to the axle may articulate with respect to the part 96b which is connected to the sprung part of the vehicle body. In order to prevent the part 96b from moving with the part 96a as the latter is rapidly oscillated during over-the-road operation, the pivot pin 100 may be extended so as to carry on one end a vane indicated by the numeral 108 which is received in a fluid-tight cavity 110 fixed within the housing part 102 and filled with hydraulic damping fluid which resists any tendency of the lever part 96b to move rapidly in response to the oscillations of the lever part 96a. Thus, during over-the-road operation, the lever part 96b remains substantially stationary with consequent retention of the valve seat 42 in a position corresponding to vehicle load. It will be apparent that the damping means has substantially no effect on the positioning of the valve seat 42 under conditions where the vehicle load is being increased or decreased with a consequent relatively slow movement of the sprung part of the vehicle with respect to the axle.

In operation of the embodiment of FIG. 1 assuming the vehicle to be heavily loaded so that the control piston 48 and hence the valve seat 42 are in raised position of FIG. 1, when the operator wishes to stop the vehicle he opens the break valve in the usual manner so that service pressure flows into the inlet cavity 12 of the valve 10. Almost immediately the piston 30 is moved downwardly and after only slight travel the exhaust valve 40 engages the valve seat 42 and immediately thereafter the inlet valve 36 is raised from its seat so as to communicate the pressure in chamber 12 with the delivery chamber 16 from which pressure flows to the brake actuators. At the same time pressure is delivered from the inlet chamber by way of conduit 76 to the underside of the balancing piston 74 to raise it to the dotted line position of FIG. 1. Because the piston 30 is required to move only a relatively slight distance in order to effect closing of the exhaust valve and opening of the inlet valve substantially none of the diaphragm 52 is moved clear of the fixed fingers 68 so that the area exposed to pressure in the delivery cavity consists of substantially no more than the area of the underside of the piston 30 and because this is equal to the area of the upperside of the piston, as soon as the pressures in the inlet and delivery cavities are equalized the spring 64 moves the piston upwardly until the inlet and exhaust valves are both closed in lapped condition. Under these conditions, that is to say where the vehicle is heavily loaded, the pressure delivered to the brake chambers will be substantially equal to the pressure flowing from the brake valve so that there is no proportioning between the service and brake chamber pressures and the brake system operates substantially as if the valve 10 were not in the system.

Assume now that the vehicle carries no load in which event the control pressure in the control chamber would be at a maximum and the control piston 48 and hence the exhaust valve seat 42 would be in the fully depressed position of FIG. 3. When the operator wishes to apply the brakes he depresses the brake valve pedal as before and service pressure is delivered to the inlet chamber 12 where it acts on the piston 30 to move it downwardly. However, because the inlet valve cannot be opened until the exhaust valve has engaged the seat 42 and because the latter is spaced a relatively great distance below the exhaust valve, the piston continues to move downwardly and in so doing it causes the fingers 70 carried by the piston to engage the diaphragm and move it away from the fixed fingers 68 and when eventually the exhaust valve engages the seat 42 the diaphragm is entirely free of the fixed fingers and at this juncture the inlet valve 36 is opened. Because the diaphragm is now supported only by the movable fingers it will be apparent from an inspection of FIG. 3 that the effective area of the diaphragm 52 exposed to the pressure in the delivery chamber 16 is considerably greater than the effective area of the piston 30 so that considerably less pressure acting on the greater diaphragm area is required to balance a greater pressure acting on the smaller area on the upper side of the piston. Hence the inlet and exhaust valves are moved to a lapped position by a brake applying pressure which is less than the service pressure actually flowing from the brake valve by an amount which is proportional to the relative size of the effective areas of the piston and diaphragm and this relationship continues for any degree of brake pedal travel between its release and fully applied positions.

Figure 4:
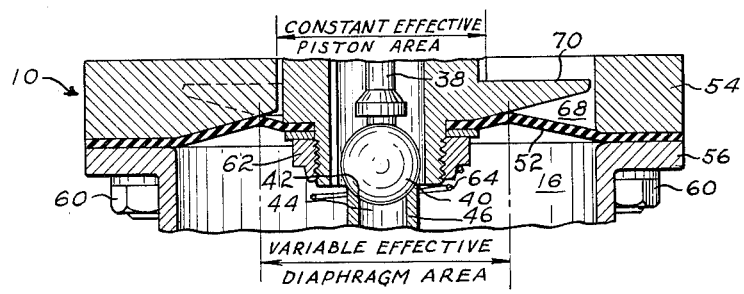

In the event that the vehicle is only partly loaded, the exhaust valve seat will be positioned intermediate the positions of FIG. 1 and FIG. 3. FIG. 4 illustrates such intermediate positioning of the exhaust valve seat and under these conditions it will be noted that as the exhaust valve 40 is moved downwardly to meet the seat 42, the movable fingers 70 pick up part of the diaphragm 52 which is thus disengaged from the fixed fingers 68 so that the effective area exposed to the pressure in delivery cavity 16 is proportionately greater than the area of the piston exposed to inlet pressure in accordance with the load on the vehicle. Hence, under conditions of partial loading, greater pressure may be delivered to the brake chambers than under conditions of no load, but the delivery pressure is nevertheless proportionately lower than brake valve pressure throughout its entire range to a degree depending upon the actual loading on the vehicle.

The operation of the embodiment of FIG. 5 should be obvious from the description of the operation of the embodiment of FIG. 1. As the vehicle load changes, the position of the valve seat 42 is varied by movement of the lever so as to cause a proportioning between service and delivery pressures which is identical to that described in connection with FIG. 1.

Figure 6:
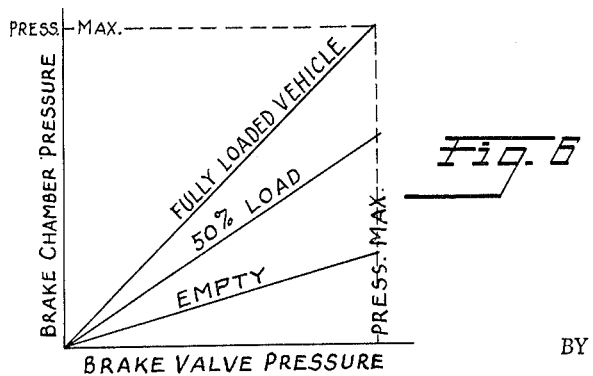
FIG. 6 is a graphical diagram showing the approximate relations between brake valve and brake chamber pressures the valve is capable of producing for various conditions of load on the vehicle.

The foregoing examples of operation can be more fully understood by reference to the graph of FIG. 6 which shows the relationship of the brake chamber pressure to the brake valve pressure under various conditions of vehicle load.

For example, by following the maximum pressure lines it will be noted that with a fully loaded vehicle the brake chamber pressure equals the brake valve pressure on the valve ratio of input to output of 1 to 1. For any other condition of loading the brake chamber pressure is proportionally less than the brake valve pressure to prevent the possibility of overbraking with an empty or partially loaded vehicle.

It should now be apparent to those skilled in the art that the present invention provides, within limits, an infinitely variable proportioning valve which is fully effective to produce the desired results by the use of a single variable area diaphragm which is related only to a constant area pressure responsive member, such as the piston 30 shown and described herein.

It will be apparent to those skilled in the art that the invention is susceptible of a variety of changes and modifications without however departing from the scope and spirit of the appended claim.

What is claimed is:

A variable pressure ratio valve comprising a casing having an inlet chamber, an outlet chamber and an exhaust chamber, a fluid pressure responsive member having a fixed motive area exposed to fluid pressure admitted to said inlet chamber, said member being provided with a passage therethrough connecting said inlet and outlet chambers, a diaphragm supported by said casing and having a variable motive area exposed to fluid pressure in said outlet chamber, said diaphragm being connected adjacent its central portion to said member for movement therewith, a valve element carried by said member and having a stem positioned in said passage, said element including a normally closed inlet valve for controlling communication between said inlet and outlet chambers and including also a normally open exhaust valve for controlling communication between the outlet and exhaust chambers, resilient means for normally closing said inlet valve, an adjustable exhaust valve seat member having an exhaust valve seat normally spaced from said exhaust valve, said seat member also having a passage therethrough normlly connecting said outlet and exhaust chambers, a piston member slidably mounted in said exhaust chamber, said piston member being connected with said exhaust valve seat member, and being movable in response to a control pressure to increase the spacing between said exhaust valve seat member and said exhaust valve, resilient means constantly acting on said piston member to decrease the spacing between said exhaust valve seat member and said exhaust valve, means for varying the effective motive area of the diaphragm subjected to fluid pressure in said outlet chamber during movement of said fluid pressure responsive member and said diaphragm, and a piston separate from said piston member and movable to engage said piston member in response to fluid pressure in said inlet chamber, said piston having an effective cross-sectional area substantially equal to that of said inlet valve when the latter is closed.

References Cited by the Examiner
UNITED STATES PATENTS

| | | | |
|---|---|---|---|
| 2,986,427 | 5/1961 | McClure et al. | 303—60 X |
| 3,011,833 | 12/1961 | Stelzer | 303—60 |
| 3,018,136 | 1/1962 | Williams | 303—22 X |
| 3,125,379 | 3/1964 | Valentine | 303—60 |

FOREIGN PATENTS 1,284,012   1/1962   France.

ARTHUR L. LA POINT, *Primary Examiner.*
EUGENE G. BOTZ, *Examiner.*